United States Patent [19]

Mousavi

[11] Patent Number: 5,017,783

[45] Date of Patent: May 21, 1991

[54] 360 DEGREE FIELD OF VIEW OPTICAL SENSING DEVICE

[75] Inventor: Ali R. Mousavi, San Jose, Calif.

[73] Assignee: C & K Systems, Inc., Folsom, Calif.

[21] Appl. No.: 427,019

[22] Filed: Oct. 25, 1989

[51] Int. Cl.$^5$ .............................................. G01T 5/08
[52] U.S. Cl. ..................................... 250/353; 250/342
[58] Field of Search ................................ 250/353, 342

[56] References Cited

U.S. PATENT DOCUMENTS 4,757,204 7/1988 Baldwin et al. ...................... 250/353

Primary Examiner—Carolyn E. Fields
Assistant Examiner—Drew A. Dunn
Attorney, Agent, or Firm—Limbach, Limbach & Sutton

[57] ABSTRACT

A 360° pattern field of view optical system for passive infrared detection device is disclosed. The optical system uses a combination of a fresnel lens and a fresnel prism to gather infrared radiation, focus the radiation, and refract radiation onto a focal point. Each of the combination of fresnel lens and prism is positioned substantially circumferentially about a central location to gather the infrared radiation from a 360° field of view and for focusing radiation gathered onto the central location. At the central location, a sensor is located. The sensor converts the focused infrared radiation into an electrical signal.

3 Claims, 3 Drawing Sheets

360 DEGREE FIELD OF VIEW OPTICAL SENSING DEVICE

TECHNICAL FIELD

The present invention relates to an improved three hundred sixty degree (360°) field of view optical sensing device, and more particularly to such a device where a fresnel lens and a fresnel prism are used in combination to increase the field of detection.

BACKGROUND OF THE INVENTION

Optical systems for the gathering of infrared radiation for passive infrared intrusion detection devices are well known in the art. In particular, infrared intrusion detection devices which are mounted on ceilings and can detect intruders within a 360° degree field of view are well known in the art.

However, heretofore, a 360° field of view optical system for passive infrared intrusion detection has used either a combination of two mirrors and a fresnel lens or two mirrors to receive the infrared radiation. The use of mirrors requires that the mirrors have superior surface finish and excellent reflection coating properties. Such mirrors with excellent coated qualities necessarily mean that they are expensive.

Another prior art ceiling mounted device for the collection of infrared radiation from a 360° field of view uses a plurality of fresnel lenses. In such a device, the plurality of fresnel lenses collect infrared radiation and focus them at a focal point where a single sensor is located. The problem with the use of fresnel lenses alone is that there is no long range detection capability. In addition, this prior art device has a "dead" zone wherein the device is unable to detect intruders in that zone or is able to detect intruders only when they are very close to the detector. This has limited the use of such a device.

SUMMARY OF THE INVENTION

A 360° field of view passive infrared intrusion detection device for gathering radiation at a distance spaced apart from a ground plane is disclosed. The device comprises a plurality of infrared radiation gathering and focusing means which are positioned substantially circumferentially about a central location and which gather infrared radiation from a 360° field of view and focus the radiation gathered onto the central location. Each of the plurality of radiation gathering and focusing means further comprises a fresnel lens for gathering the radiation at a first angle with respect to the ground plane and for focusing the radiation gathered to the central location and a fresnel prism for gathering radiation from the fresnel lens at the first angle and for refracting the gathered radiation onto the central location at a second angle. The second angle is greater than the first angle with respect to the ground plane. A sensor is located at the central location for converting the infrared radiation into an electrical signal.

DETAILED DESCRIPTION OF THE DRAWINGS

Figure 1:
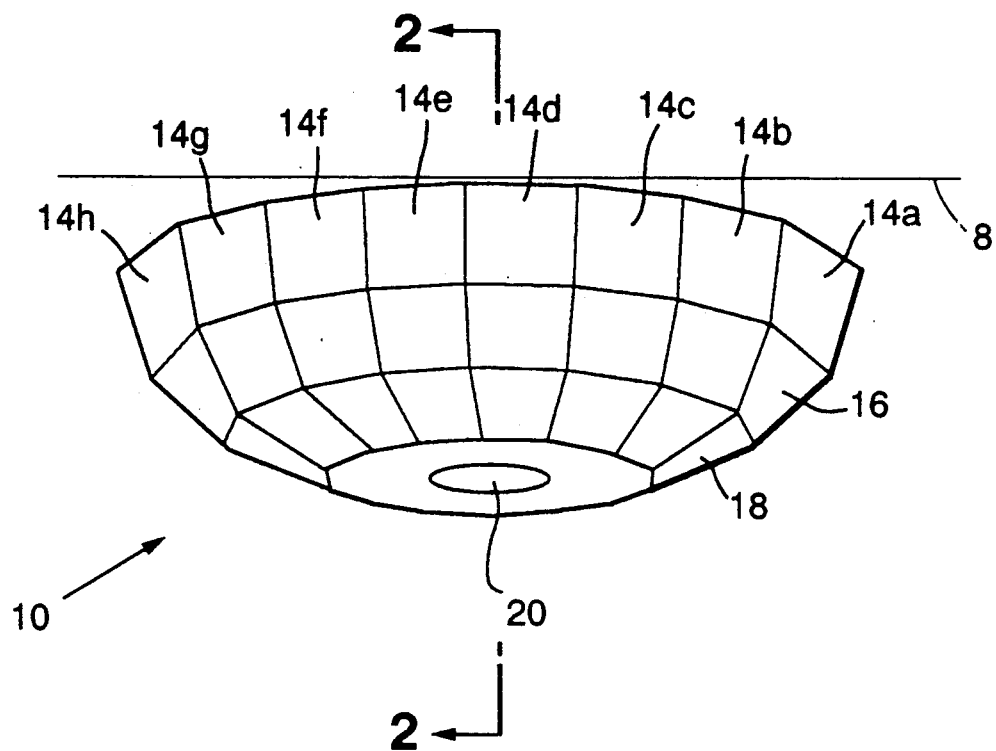
FIG. 1 is a perspective view of the passive infrared optical gathering device of the present invention shown positioned at a level spaced apart from a ground plane.

Referring to FIG. 1 there is shown a perspective view of a 360° field of view passive infrared intrusion detection device 10 of the present invention. The device 10 is typically mounted on a ceiling 8 at a distance spaced apart from a ground plane 12. The device 10 comprises a plurality of infrared radiation gathering and focusing means 14 (a ... h ... ) which are positioned substantially circumferentially about a central location 30 shown in FIG. 2. Further, a plurality of rows of the infrared radiation gathering and focusing means 14, 16 and 18 are positioned substantially circumferentially about the central location 30. Each of the rows 14, 16 or 18 of the infrared radiation gathering and focusing means gather infrared radiation from a 360° field of view and focuses the radiation gathered onto the central location 30. A single radiation gathering and focusing means 20 gathers radiation substantially perpendicular to the ground plane 12.

Figure 2:
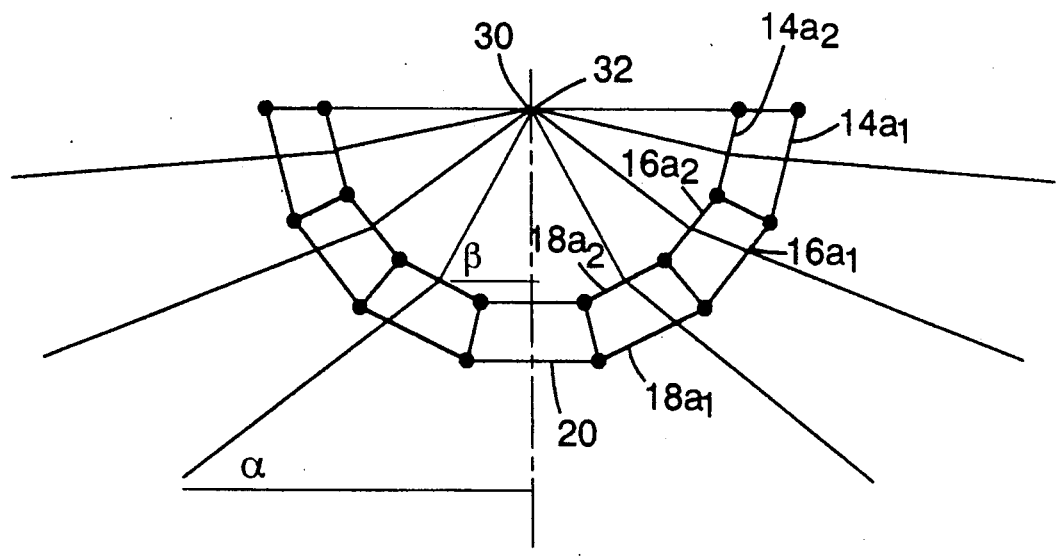
FIG. 2 is a schematic cross sectional view of the device shown in FIG. 1 taken along the lines 2—2.

Referring to FIG. 2, there is shown schematically three of the infrared radiation gathering and focusing means (14a, 16a and 18a). Each of the infrared radiation gathering and focusing means (14a, 16a and 18a) comprises two parts: a fresnel lens (designated with subscript 1 such as $14a_1$) and a fresnel prism (designated with the subscript 2 such as $14a_2$). For the purpose of illustrating the function of each of the infrared radiation gathering and focusing means, the description will now relate to the infrared radiation gathering and focusing means 18a. However, it should be apparent to those of ordinary skill in the art that the description is equally applicable to all the other infrared radiation gathering focusing means (14a ... ; 16a ... ; and 18b ... ).

In the operation of the infrared radiation gathering and focusing means 18a, the fresnel lens $18a_1$ gathers infrared radiation at a first angle $\alpha$ with respect to the ground plane 12. The light is gathered by the fresnel lens $18a_1$, passes therethrough and is focused through the fresnel prism $18a_2$ at the central location 30. The fresnel prism $18a_2$ gathers the radiation from the fresnel lens $18a_1$ also at the first angle $\alpha$ and refracts the gathered radiation onto the central location 30 at a second angle $\beta$ with respect to the ground plane 12. The second angle $\beta$ is greater than the first angle $\alpha$. Each of the infrared radiation gathering and focusing means, comprising of a fresnel lens and a fresnel prism, function in the same manner. The plurality of gathered and focused and refracted radiation from each of the infrared radiation gathering focusing means is brought to a focus at the central point 30.

Figure 3:
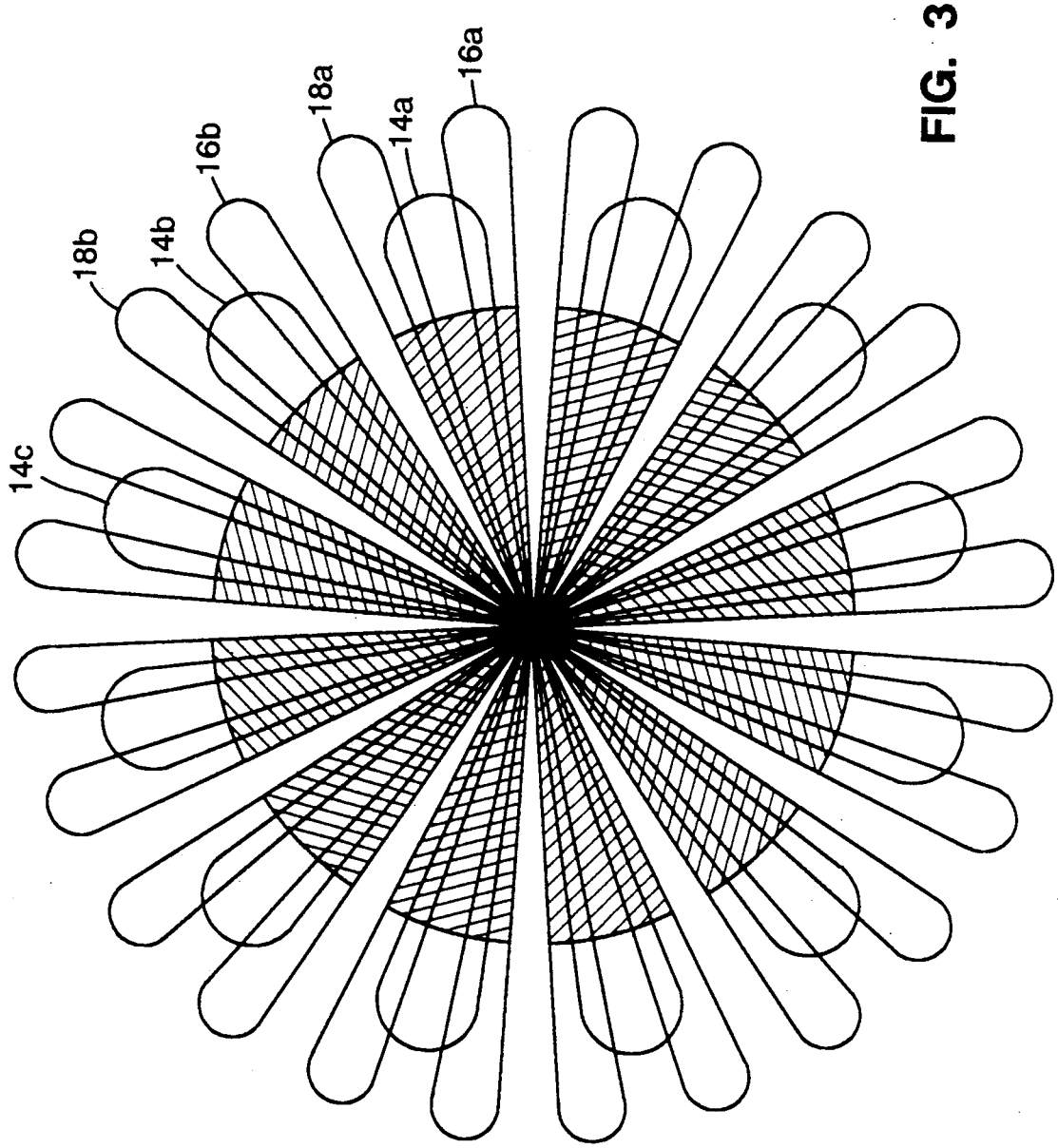
FIG. 3 is a plan view of the pattern of detection of the device of the present invention.

Located at the central point 30 is a sensor 32, which converts the detected infrared radiation into an electrical signal. Such a sensor 32, such as pyroelectric, is well known in the art. Referring to FIG. 3, there is shown a graphical illustration of the 360° field of view provided by the plurality of infrared radiation gathering and focusing means. There is one zone associated with each of the infrared radiation gathering and focusing means.

Figure 4:
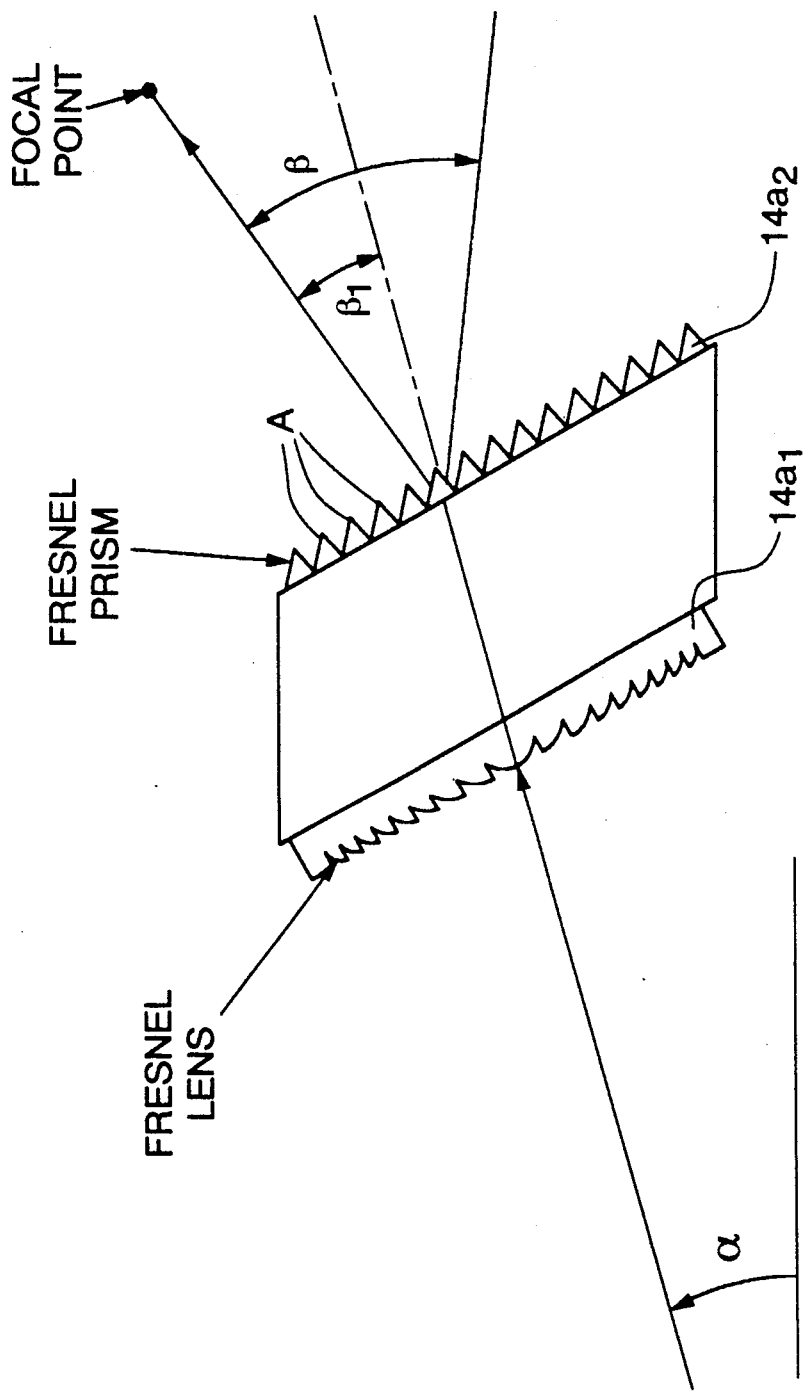
FIG. 4 is a partial schematic view of one combination of fresnel lens and fresnel prism showing the gathering of the radiation, the focusing thereof by the fresnel lens, and the refraction thereof by the fresnel prism onto the focal point.

Referring to FIG. 4 there is shown in greater detail an infrared radiation gathering and focusing means comprising of a fresnel lens $14a_1$ and its associated fresnel prism $14a_2$. The fresnel lens $14a_1$ is of conventional design with the grooved facet and slope of each groove in the fresnel lens located on the side adapted to received the infrared radiation. Such a fresnel lens is well known in the art and can be constructed in accordance with the following spherical or aspheric equation:

$$Z = \frac{CY^2}{1 + \sqrt{1 - (K + 1)C^2Y^2}}$$

The C & K values refer to the grooved surface.

$$\text{Slope} = \frac{dz}{dy} = \frac{2YC}{1 + \sqrt{1 - (K + 1)C^2Y^2}} + \frac{(K + 1)C^3Y^3}{\sqrt{1 - (K + 1)C^2Y^2} \; (1 + \sqrt{1 - (K + 1)C^2Y^2})}$$

OR an equation used to calculate the groove angle a to correct for spherical aberration.

$$\tan a = \frac{\sin\alpha + \sin\beta}{\sqrt{N^2 - \sin^2\alpha} - \cos\beta}$$

a = groove angle
$\alpha$ = ray angle with respect to optical axis plano surface
$\beta$ = ray angle with respect to optical axis grooved surface After finding the slope for optimum refraction, there are three ways to design the grooves.
1. Maintain the same depth on all grooves and vary the width;
2. Maintain the same width and vary the depth;
3. Vary both the depth and the width.

As for the refraction by the fresnel prism $14a_2$, the angle of deviation $\beta_1$ can be determined from the following equation:

$$N(\sin\tfrac{1}{2}A) = \sin\tfrac{1}{2}(A + \beta_1)$$

N = refraction index
A = apex angle of the prism (see FIG. 4)

Both the fresnel lens and the fresnel prism can be manufactured by compression or injection molding. The quality of compression molding of a fresnel lens is superior to that produced by injection molding. As for the design for the master fresnel lens and prism, a diamond tool is typically used to cut into a die material forming the entire surface of the fresnel lens and prism. This process is repeated as many times as there are grooves required for the lens and prism design.

There are many advantages of the apparatus of the present invention. First, because only refractive material is used, i.e., no mirror is used, less costly materials can be used. Further, by using a fresnel lens in conjunction with a fresnel prism to refract the light, the fresnel lens can be used to gather light from further distances than heretofore achievable. Once the radiation from the long range is gathered, it is refracted by the fresnel prism onto the focal point. Thus, the device 10 of the present invention has long range capabilities in addition to intermediate and short range. Of course, it should be understood that the diameter of the circle of the zones depends upon the device 10's mounting height. Each zone can be divided into one or more elements depending on the number of sensing elements used in the sensor 32, thereby varying the number of zones of protection.

What is claimed is:

1. A three hundred sixty degree (360°) passive infrared radiation intrusion detector for gathering radiation at a distance spaced apart from a ground plane comprising:
    a plurality of infrared radiation gathering and focusing means positioned substantially circumferentially about a central location for gathering infrared radiation from a 360° field of view and for focusing said radiation gathered onto said central location;
    each of said plurality of infrared radiation gathering and focusing means comprises a combination fresnel lens and fresnel prism for directing said infrared radiation onto said central location; and
    a sensor at said central location for receiving radiation from said plurality of infrared radiation gathering and focusing means and for converting same into an electrical signal.

2. The detector of claim 1 further comprising:
    a lens for gathering radiation from said ground plane substantially perpendicular thereto and for focusing said gathered radiation onto said sensor.

3. The detector of claim 1 wherein each of said combination fresnel lens and fresnel prism further comprising:
    a fresnel lens for gathering radiation at a first angle with respect to said ground plane and for focusing said radiation onto said central location; and
    a fresnel prism for gathering radiation from said fresnel lens at said first angle and for refracting said gathered radiation onto said central location at a second angle, greater than said first angle, with respect to said ground plane.

* * * * *